United States Patent Office 3,357,887
Patented Dec. 12, 1967

3,357,887
4-PHENOXY-3,5-DIHALOPHENYLALKANOLS AND HYPOCHOLESTEREMIC COMPOSITIONS CONTAINING THE SAME
Fred Kagan and William J. Wechter, Kalamazoo, Mich., assignors to The Upjohn Company, Kalamazoo, Mich., a corporation of Delaware
No Drawing. Filed Apr. 2, 1965, Ser. No. 445,269
17 Claims. (Cl. 167—65)

This application is a continuation-in-part of application Ser. No. 241,541, filed Dec. 3, 1962 and now abandoned.

The present invention relates to a novel process for the preparation of (4-phenoxy-3,5-dihalophenyl)alkanols and to novel hypocholesteremic compositions containing (4-phenoxy-3,5-dihalophenyl)alkanols as principal active ingredient.

(4-phenoxy-3,5-dihalophenyl)alkanols of the present invention can be represented by the formula:

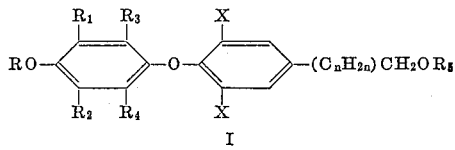

I wherein R represents hydrogen, alkyl of 1 to 4 carbon atoms, inclusive, e.g., methyl, ethyl, propyl, isopropyl, butyl, isobutyl, and the like, and acyl, wherein acyl is derived from an alkanoic acid containing 2 to 4 carbon atoms, inclusive, e.g., acetic, propionic, and butyric acids; $R_1$ and $R_2$ represent hydrogen, alkyl of 1 to 4 carbon atoms, inclusive, e.g., methyl, ethyl, propyl, isopropyl, butyl, and the like, and halogen; $R_3$ and $R_4$ represent hydrogen and alkyl of 1 to 4 carbon atoms, inclusive, e.g., methyl, ethyl, propyl, isopropyl, butyl, isobutyl, and the like; $R_5$ represents hydrogen, phosphono, and acyl, wherein acyl is derived from an alkanoic acid containing 2 to 4 carbon atoms, inclusive, e.g., acetic, propionic, and butyric acids; X represents halogen, and $n$ represents an integer of 0 to 3, inclusive.

The preparation of representative compounds of the present invention has been described in J. Biol Chem. 235, 3292 (1960). The process disclosed therein can also be employed to prepare other compounds of the present invention. For example, other alkyl (4-hydroxyphenyl) alkanoates [e.g., the methyl and ethyl esters of 4-hydroxybenzoic acid, 3-(4-hydroxyphenyl)propionic acid, 2-(4-hydroxyphenyl)butyric acid and 4-(4-hydroxyphenyl) butyric acid] can be substituted for ethyl 4-hydroxyphenylacetate. Likewise, other 4-alkoxyphenols such as those disclosed below can be substituted for 4-methoxyphenol; other halogenating agents such as cuprous chloride and hydrochloric acid, and cuprous bromide and hydrobromic acid, can be substituted for iodine and alkalimetal iodide in the Sandmeyer reaction; and other alkanoic acids such as propionic, butyric and isobutyric acids, and their silver salts, can be substituted for acetic acid and silver acetate.

In addition to the above process, the compounds of the present invention having the following formula:

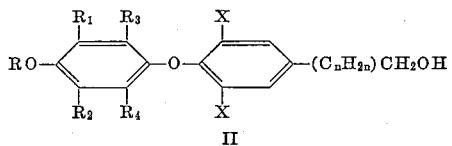

II wherein R, $R_1$, $R_2$, $R_3$, $R_4$, X and $n$ have the above values can also be prepared by reducing (4-phenoxy-3,5-dihalophenyl) alkanoic acids having the formula:

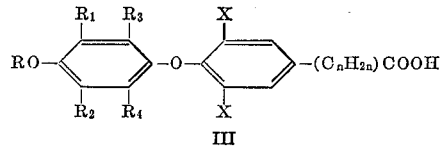

III wherein, R, $R_1$, $R_2$, $R_3$, $R_4$, X and $n$ have the above values, with diborane. The reaction can be carried out in an inert solvent such as tetrahydrofuran, either, dimethyl ether of diethylene glycol, dioxane, and the like, at temperatures from about —20° C. to about 50° C. with about 0° C. to about 30° C. being preferred.

Representative (4 - phenoxy-3,5-dihalophenyl)alkanoic acids which can be utilized include 3-[3,5-diiodo-4-(4-hydroxyphenoxy)phenyl]propionic acid,
3,5-diiodo-4-(4-hydroxyphenoxy)phenylacetic acid,
4-[3,5-diiodo-4-(4-methoxyphenoxy)phenyl]butyric acid,
4-[3,5-diiodo-4-(3,5-dimethyl-4-hydroxyphenoxy) phenyl]butyric acid,
3,5-diiodo-4-(3,5-dimethyl-4-hydroxyphenoxy)phenylacetic acid,
3,5-diiodo-4-(4-methoxyphenoxy)phenylacetic acid,
3,5-diiodo-4-(3-methyl-4-methoxyphenoxy)phenylacetic acid,
3-[3,5-diiodo-4-(2-methyl-4-hydroxyphenoxy) phenyl]propionic acid,
3-[3,5-diiodo-4-(2-methyl-4-methoxyphenoxy) phenyl]propionic acid,
4-[3,5-diiodo-4-(3,5-diiodo-4-hydroxyphenoxy) phenyl]butyric acid,
4-[3,5-diiodo-4-(3-iodo-4-hydroxyphenoxy) phenyl]butyric acid,
3-[3,5-diiodo-4-(3,5-diiodo-4-hydroxyphenoxy) phenyl]propionic acid,
3-[3,5-diiodo-4-(3-iodo-4-hydroxyphenoxy) phenyl]propionic acid,
3-[3,5-diiodo-4-(3,5-diiodo-4-isobutoxyphenoxy) phenyl]propionic acid,
3-[3,5-diiodo-4-(3,5-diiodo-4-ethoxyphenoxy) phenyl]propionic acid,
3-[3,5-diiodo-4-(3,5-dimethyl-4-hydroxyphenoxy) phenyl]propionic acid,
3-[3,5-diiodo-4-(2-methyl-5-iodo-4-hydroxyphenoxy) phenyl]propionic acid,
3,5-diiodo-4-(3,5-diiodo-4-hydroxyphenoxy) phenylacetic acid,
3,5-diiodo-4-(3-iodo-4-hydroxyphenoxy)phenylacetic acid,
3,5-diiodo-4-(3-iodo-4-methoxyphenoxy)phenylacetic acid,
3,5-diiodo-4-(3,5-dimethyl-4-propionyloxy) phenylacetic acid,
3,5-diiodo-4-(3,5-diiodo-4-hydroxyphenoxy)benzoic acid,
3,5-diiodo-4-(3-iodo-4-hydroxyphenoxy)benzoic acid,
3,5-diiodo-4-(4-hydroxyphenoxy)benzoic acid,
3,5-diiodo-4-(4-methoxyphenoxy)benzoic acid,
3,5-dibromo-4-(3,5-dimethyl-4-methoxyphenoxy) phenylacetic acid,
3,5-dibromo-4-(4-hydroxyphenoxy)phenylacetic acid,
3,5-dibromo-4-(4-methoxyphenoxy)phenylacetic acid,
3,5-dibromo-4-(3-bromo-4-hydroxyphenoxy)phenylacetic acid,
3,5-dibromo-4-(3,5-dibromo-4-hydroxyphenoxy) phenylacetic acid, 3,5-dichloro-4-(4-hydroxyphenoxy)phenylacetic acid,
3,5-dichloro-4-(4-methoxyphenoxy)phenylacetic acid,
3,5-dichloro-4-(3-chloro-4-hydroxyphenoxy)phenylacetic acid,
3,5-dichloro-4-(3,5-dichloro-4-hydroxyphenoxy)phenylacetic acid,
3,5-dichloro-4-(4-hydroxyphenoxy)benzoic acid,
3,5-dichloro-4-(3-chloro-4-hydroxyphenoxy)benzoic acid,
4-[3,5-dichloro-4-(2-isopropyl-5-methyl-4-methoxyphenoxy]phenylbutyric acid,
3-[3,5-dibromo-4-(2,5-diethyl-4-methoxyphenoxy)phenyl]propionic acid,
3,5-dibromo-4-(2,3-dimethyl-4-butoxyphenoxy)benzoic acid,
3,5-dibromo-4-(3-chloro-4-hydroxyphenoxy)phenylacetic acid,
3,5-dibromo-4-(4-acetoxyphenoxy)phenylacetic acid,
3,5-dibromo-4(3,5-dimethyl-4-hydroxyphenoxy)phenylacetic acid,
3,5-dichloro-4-(3,5-dimethyl-4-methoxyphenoxy)phenylacetic acid,
3,5-dichloro-4-(3,5-dimethyl-4-hydroxyphenoxy)phenylacetic acid,
3-[3-bromo-5-iodo-4-(4-hydroxyphenoxy)phenyl]propionic acid, and the like.

The starting (4-phenoxy - 3,5 - dihalophenyl)alkanoic acids can be prepared by procedures well known in the art. For example, Kharasch et al., J. Org. Chem., 21, 925, 929 (1956), disclose a procedure for the preparation of representative propionic and butyric acid derivatives.

Meltzer et al. J. Oreg. Chem. 22 1577 (1957), disclose a process for the preparation of representative acetic and benzoic acid derivatives.

In the processes disclosed by Kharasch et al. and Meltzer et. al., the acetic acid, propionic acid, butyric acid, and benzoic acid derivatives are prepared by condensing a 4-alkoxyphenol with an alkyl (4-mesyloxy-3,5-dinitrophenyl)alkanoate or an alkyl (4-tosyloxy-3,5-dinitrophenyl)alkanoate to obtain an alkyl [4-(4-alkoxyphenoxy)-3,5-dinitrophenyl]alkanoate, reducing the nitro groups of the latter to amino, replacing the amino groups with halogen via the diazonium compound and Sandmeyer reaction, and hydrolyzing the resulting alkyl [4-(4-alkoxyphenoxy)-3,5-dihalophenyl]alkanoate to obtain the corresponding [4-(4-alkoxyphenoxy)3,5 - dihalophenyl]alkanoic acid. Alternatively, the alkyl [4-(4-alkoxyphenoxy)-3,5-dihalophenyl]alkanoate can be dealkylated and deesterified by heating with a mixture of acetic acid and hydriodic acid or hydrobromic acid to obtain the corresponding [4-(4-hydroxyphenoxy) - 3,5 - dihalophenyl]alkanoic acid. The [4-(4-alkoxyphenoxy)-3,5-dihalophenyl]alkanoic acids and [4-(4-hydroxyphenoxy)-3,5-dihalophenyl]alkanoic acids of Formula III in which $R_1$ or $R_2$, or both, are hydrogen can be halogenated to obtain the corresponding acids in which $R_1$ or $R_2$, or both, are halogen. Such halogenation can be accomplished by procedures known in the art, e.g., Meltzer et al., supra; Clayton et al., J. Chem. Soc., 2467 (1951); Harington et al., Biochem. J., 50, 438 (1952); and Dibbo et al., J. Chem. Soc., 2890 (1961).

Substituted 4-alkoxyphenols can be prepared by the Elbs reaction [J. Chem. Soc., 2303 (1948)] Representative 4-alkoxyphenols which can be utilized include 4-methoxyphenol, 4-ethoxyphenol, 4-propoxyphenol, 4-butoxyphenol, 4-isobutoxyphenol, 3-methyl-4-methoxyphenol, 2-methyl-4-methoxyphenol, 3-methyl-4-propoxyphenol, 2,5-dimethyl-4-methoxyphenol, 2,3-dimethyl-4-methoxyphenol, 2-methyl-4-methoxyphenol, 2,3-dimethyl-4-butoxyphenol, 2 - isopropyl-5-methyl-4-methoxyphenol, 2,3,5-trimethyl-4-methoxyphenol, 2,3,5 - trimethyl-4-propoxyphenol, 2,3,5,6-tetramethyl-4-methoxyphenol, 2,3,5,6-tetramethyl-4-propoxyphenol, 3,5-dimethyl-4-methoxyphenol, 3,5 - diethyl-4-methoxyphenol, 3,5 - dibromo-4-methoxyphenol, 3,5-dichloro-4-methoxyphenol, and the like.

Another useful process for the preparation of representative acetic acid derivatives is disclosed in British Patent 882,401, wherein a nitro oxazolone derivative is reacted with a mixture of acetic and hydrohalic acids to form the corresponding nitro pyruvic acid derivative, the latter is decomposed with hydrogen peroxide in alkaline solution to form the corresponding nitro acetic acid derivative, the nitro group of the latter is reduced to an amino group, and the amino group is replaced with halogen via the diazonium compound and Sandmeyer reaction.

Still other processes for the preparation of the alkanoic acids are disclosed by Ziegler et al., J. Org. Chem., 27, 3335 (1962); Dibbo et al., supra: Dibbo et al., J. Chem. Soc., 2645 (1961); and German Patent 1,078,582.

The production of (4-phenoxy-3,5-dihalophenyl)alkanol acylates and phosphates can be carried out in a variety of ways. For example, the alcohol acylates (Formula I, R=hydrogen or alkyl, and $R_5$=acyl) can be prepared by the process disclosed in J. Biol. Chem., 235, 3292 (1960). When R in Formula I is alkyl the alcohol acylates can also be produced by reacting [4-(4-alkoxyphenoxy)-3,5-dihalophenyl]alkanols with acylating agents such as alkanoyl halides and alkanoic anhydrides, e.g., acetyl, propionyl, butyryl and isobutyryl chlorides, acetic, propionic and butyric anhydrides and the like.

The diacylates (Formula I, R and $R_5$=acyl) can be prepared by reacting an unesterified [4-(4-hydroxyphenoxy)-3,5-dihalophenyl]alkanol (Formula I, R and $R_5$=hydrogen) with an acylating agent such as exemplified above.

The phenol esters, i.e., [4-(4-acyloxyphenoxy)-3,5-dihalophenyl]alkanols (Formula I, R=acyl and $R_5$=hydrogen) can be prepared by reacting a [4-(4-hydroxyphenoxy)-3,5-dihalophenyl]alkanoic acid (Formula III, R=hydrogen) with an alkanoic anhydride and reducing the resulting compound with diborane in the presence of an inert solvent such as ether, tetrahydrofuran or the like, at temperatures from about −20° C. to about 50° C. with about 0° C. to about 30° C. being preferred.

The [4-(4-hydroxyphenoxy)-3,5-dihalophenyl]alkanol phosphates (Formula I, R=hydrogen and $R_5$=phosphono) can be prepared by reacting about 1 mole equivalent of a [4-(4-acyloxyphenoxy)-3,5-dihalophenyl]alkanol with about 2 mole equivalents of 2-cyanoethyl phosphate at about 25° C. in the presence of anhydrous pyridine and about 8 mole equivalents of dicyclohexylcarbodiimide as the condensing agent, and subjecting the resulting product to alkaline hydrolysis utilizing a hydrolyzing agent such as lithium hydroxide or sodium hydroxide at about 20–100° C. The [4-(4-alkoxyphenoxy)-3,5-dihalophenyl]alkanol phosphates (Formula I, R=alkyl and $R_5$=phosphono) can be prepared by substituting [4-(4-alkoxyphenoxy)-3,5-dihalophenyl]alkanol for [4-(4-acyloxyphenoxy)-3,5-dihalophenyl]alkanol in the reaction with 2-cyanoethyl phosphate, and subjecting the resulting product to alkaline hydrolysis as described above. The [4-(4-acyloxyphenoxy)-3,5-dihalophenyl]alkanol phosphates (Formula I, R=acyl and $R_5$=phosphono) can be prepared by reacting a [4-(4-hydroxyphenoxy)-3,5-dihalophenyl]alkanol phosphate (Formula I, R=hydrogen and $R_5$=phosphono) with an acylating agent such as exemplified above.

The following examples are illustrative of the process and products of the present invention but are not to be construed as limiting.

EXAMPLE 1

*3,5-diiodo-4-(3,5-dimethyl-4-hydroxyphenoxy) phenethyl alcohol*

A solution of 3,5-diiodo-4-(3,5-dimethyl-4-hydroxyphenoxy)phenylacetic acid (2.0 g.) in 20 ml. of dry tetrahydrofuran was treated with a slow stream of diborane gas mixed with nitrogen. A vigorous reaction ensued with the liberation of hydrogen and after about five minutes the reaction mixture set up to a white solid. The diborane addition was stopped, 20 ml. of tetrahydrofuran was added, and the mixture was stirred at ambient temperature for 30 minutes. Water (20 ml.) was added, the tetrahydrofuran was removed under reduced pressure, and the resulting white solid product was separated by filtration, washed well with water, and dried under reduced pressure at 60° C. Recrystallization from benzene gave colorless prisms and further recrystallization from ethanol-water resulted in the production of 3,5-diiodo-4-(3,5-dimethyl - 4 - hydroxyphenoxy)phenethyl alcohol which melted between 193–197° C. An analytical sample was prepared by recrystallization from ethanol and melted between 197–198.5° C.

Analysis.—Calcd. for $C_{16}H_{16}I_2O_3$: C, 37.67; H, 3.16; I, 49.76. Found: C, 38.03; H, 2.88; I, 49.34.

Investigation of the infrared spectrum (mineral oil mull) of 3,5-diiodo-4-(3,5-dimethyl-4-hydroxyphenoxy)phenethyl alcohol has shown the presence of two polymorphic forms of the compound. These forms differ in absorbance pattern in the 840 to 865 cm.$^{-1}$ region. One form has a doublet with absorbance peaks at 850 and 860 cm.$^{-1}$; the other form has a triplet with absorbance peaks at 842, 855 and 865 cm.$^{-1}$.

EXAMPLE 2

*4-[3,5-diiodo-4-(3,5-diiodo-4-hydroxyphenoxy)phenyl]-1-butanol*

In the same manner as shown in Example 1, 4-[3,5-diiodo-4-(3,5 - diiodo-4-hydroxyphenoxy)phenyl]-1-butanol was prepared by utilizing 700 mg. of 4-[3,5-diiodo-4-(3,5-diiodo-4-hydroxyphenoxy)phenyl]butyric acid instead of 3,5-diiodo-4-(3,5-dimethyl-4-hydroxyphenoxy)phenylacetic acid. The product was recrystallized from ethanol-water and melted between 149–158.5° C., and on further recrystallization from the same solvent the product melted between 153.5–156.5° C.

Analysis.—Calcd. for $C_{16}H_{14}I_4O_3$: I, 66.62. Found: I, 65.43.

EXAMPLE 3

*3,5-diiodo-4-(3,5-dimethyl-4-hydroxyphenoxy)phenethyl alcohol diacetate*

A 1.0 g. sample of 3,5-diiodo-4-(3,5-dimethyl-4-hydroxyphenoxy)phenethyl alcohol was treated with 1 ml. of acetic anhydride in 10 ml. of pyridine at 25° C. for 16 hours. The reaction mixture was poured into 100 ml. of water and on standing 1.1 g. of amorphous white solid was obtained which on crystallization from Skellysolve B (a mixture of hexanes having a boiling range of 140–160° F.) gave 0.93 g. of a white crystalline solid. Recrystallization from Skellysolve B resulted in the production of 3,5-diiodo-4-(3,5 - dimethyl-4-hydroxyphenoxy)phenethyl alcohol diacetate which melted between 139.5–140.5° C.

Analysis.—Calcd. for $C_{20}H_{20}I_2O_5$: C, 40.52; H, 3.40; I, 42.82. Found: C, 40.85; H, 3.37; I, 41.94.

EXAMPLE 4

*3-[3,5-diiodo-4-(3-iodo-4-hydroxyphenoxy)phenyl]-1-propanol*

In the same manner as shown in Example 1, 3-[3,5-diiodo-4-(3-iodo-4-hydroxyphenoxy)phenyl] - 1 - propanol was prepared by substituting 3-[3,5-diiodo-4-(3-iodo-4-hydroxyphenoxy)phenyl]propionic acid for 3,5-diiodo-4-(3,5-dimethyl-4-hydroxyphenoxy)phenylacetic acid. The product melted between 168–169° C.

Analysis.—Calcd. for $C_{15}H_{13}I_3O_3$: C, 28.96; H, 2.10; I, 61.40. Found: C, 29.34; H, 2.27; I, 60.78.

EXAMPLE 5

*3,5-diiodo-4-(hydroxyphenoxy)phenethyl alcohol*

In the same manner as shown in Example 1, 3,5-diiodo-4-(4-hydroxyphenoxy)phenethyl alcohol was prepared by substituting 3,5-diiodo-4-(4-hydroxyphenoxy)phenylacetic acid for 3,5-diiodo-4-(3,5-dimethyl-4-hydroxyphenoxy)phenylacetic acid. The product melted between 182.5–183.5° C.

Analysis.—Calcd. for $C_{14}H_{12}I_2O_3$: C, 34.88; H, 2.51; I, 52.66. Found: C, 34.89; H, 2.62; I, 52.73.

EXAMPLE 6

*3,5-diiodo-4-(iodo-4-hydroxyphenoxy)phenethyl alcohol*

In the same manner as shown in Example 1, 3,5-diiodo-4-(3-iodo-4-hydroxyphenoxy)phenethyl alcohol was prepared by substituting 3,5-diiodo-4-(3-iodo-4-hydroxyphenoxy)phenylacetic acid for 3,5-diiodo-4-(3,5-dimethyl-4-hydroxyphenoxy)phenylacetic acid. The product melted between 185–186° C.

Analysis.—Calcd. for $C_{14}H_{11}I_3O_3$: C, 27.65; H, 1.82; I, 62.62. Found: C, 27.65; H, 2.08; I, 62.49.

EXAMPLE 7

*3-[3,5-diiodo-4-(4-hydroxyphenoxy)phenyl]-1-propanol*

In the same manner as shown in Example 1, 3-[3,5-diiodo-4-(4-hydroxyphenoxy)phenyl]-1-propanol was prepared by substituting 3-[3,5-diiodo-4-(4-hydroxyphenoxy)phenyl]propionic acid for 3,5-diiodo-4-(3,5-dimethyl-4-hydroxyphenoxy)phenylacetic acid. The compound melted between 192–193° C.

Analysis.—Calcd. for $C_{15}H_{14}I_2O_3$: C, 36.31; H, 2.84; I, 51.16. Found: C, 36.16; H, 2.61; I, 50.92.

EXAMPLE 8

*4-[3,5-diiodo-4-(4-methoxyphenoxy)phenyl]-1-butanol*

In the same manner as shown in Example 1, 4-[3,5-diiodo-4-(4-methoxyphenoxy)phenyl]-1-butanol was prepared by substituting 4-[3,5-diiodo-4-(4-methoxyphenoxy)phenyl]butyric acid for 3,5-diiodo-4-(3,5-dimethyl-4-hydroxyphenoxy)phenylacetic acid.

EXAMPLE 9

*3-[3,5-diiodo-4-(3,5-diiodo-4-isobutoxyphenoxy)phenyl]-1-propanol*

In the same manner as shown in Example 1, 3[3,5-diiodo-4-(3,5-diiodo-4-isobutoxyphenoxy)phenyl] - 1-propanol was prepared by substituting 3-[3,5-diiodo-4-(3,5-diiodo-4-isobutoxyphenoxy)phenyl]propionic acid for 3,5-diiodo - 4-(3,5-dimethyl-4-hydroxyphenoxy)phenylacetic acid.

EXAMPLE 10

*3-[3,5-diiodo-4-(3,5-diiodo-4-ethoxyphenoxy)phenyl]-1-propanol*

In the same manner as shown in Example 1, 3-[3,5-diiodo-4-(3,5 - diiodo-4-ethoxyphenoxy)phenyl]1-propanol was prepared by substituting 3-[3,5-diiodo-4-(3,5-diiodo-4-ethoxyphenoxy)phenyl]propionic acid for 3,5-diiodo - 4 - (3,5-dimethyl-4-hydroxyphenoxy)phenylacetic acid.

EXAMPLE 11

*3-[3,5-diiodo-4-(3,5-dimethyl-4-hydroxyphenoxy)phenyl]-1-propanol*

In the same manner as shown in Example 1, 3-[3,5-diiodo-4-(3,5-dimethyl - 4 - hydroxyphenoxy)phenyl]-1-propanol was prepared by substituting 3-[3,5-diiodo-4-(3,5-dimethyl-4-hydroxyphenoxy)phenyl]propionic acid for 3,5 - diiodo-4-(3,5-dimethyl-4-hydroxyphenoxy)phenylacetic acid.

EXAMPLE 12

*4-[3,5-diiodo-4-(3,5-dimethyl-4-hydroxyphenoxy)phenyl]-1-butanol*

In the same manner as disclosed in Example 1, 4-[3,5-diiodo-4-(3,5-dimethyl - 4 - hydroxyphenoxy)phenyl]-1-butanol was prepared by substituting 4-[3,5-diiodo-4-(3,5- dimethyl-4-hydroxyphenoxy)phenyl]butyric acid for 3,5-diiodo-4-(3,5-dimethyl - 4 - hydroxyphenoxy)phenylacetic acid.

EXAMPLE 13

*4-[3,5-diiodo-4-(4-hydroxyphenoxy)phenyl]-1-butanol*

In the same manner as shown in Example 1, 4-[3,5-diiodo-4-(4-hydroxyphenoxy)phenyl]1-butanol was prepared by substituting 4-[3,5-diiodo-4-(4-hydroxyphenoxy)phenyl]butyric acid for 3,5-diiodo-4-(3,5-dimethyl-4-hydroxyphenoxy)phenylacetic acid.

EXAMPLE 14

*3,5-diiodo-4-(4methoxyphenoxy)phenethyl alcohol*

In the same manner as shown in Example 1, 3,5-diiodo-4-(4-methoxyphenoxy)phenethyl alcohol was prepared by substituting 3,5-diiodo-4-(4-methoxyphenoxy)phenylacetic acid for 3,5-diiodo-4-(3,5-dimethyl-4-hydroxyphenoxy)phenylacetic acid.

EXAMPLE 15

*3,5-diiodo-4-(3,5-dimethyl-4-methoxyphenoxy)phenethyl alcohol*

In the same manner as shown in Example 1, 3,5-diiodo-4-(3,5-dimethyl - 4 - methoxyphenoxy)phenethyl alcohol was prepared by substituting 3,5-diiodo-4-(3,5-dimethyl-4-methoxyphenoxy)phenylacetic acid for 3,5-diiodo-4-(3,5-dimethyl-4-hydroxyphenoxy)phenylacetic acid. The compound melted between 134.5–135.5° C.

*Analysis.*—Calcd. for $C_{17}H_{18}I_2O_3$: C, 38.95, H, 3.46; I, 48.42. Found: C, 38.81; H, 3.65; I, 48.5.

EXAMPLE 16

*3-[3,5-diiodo-4-(2-methyl-4-hydroxyphenoxy)phenyl]-1-propanol*

In the same manner as shown in Example 1, 3-[3,5-diiodo-4-(2-methyl - 4 - hydroxyphenoxy)phenyl]-1-propanol was prepared by substituting 3-[3,5-diiodo-4-(2-methyl-4-hydroxyphenoxy)phenyl]propionic acid for 3,5-diiodo-4-(3,5 - dimethyl-4-hydroxyphenoxy)phenylacetic acid.

EXAMPLE 17

*3-[3,5-diiodo-4-(2-methyl-4-methoxyphenoxy)phenyl]-1-propanol*

In the same manner as shown in Example 1, 3-[3,5-diiodo-4-(2-methyl - 4 - methoxyphenoxy)phenyl]-1-propanol was prepared by substituting 3-[3,5-diiodo-4-(2-methyl-4-methoxyphenoxy)phenyl]propionic acid for 3,5-diiodo-4-(3,5 - dimethyl-4-hydroxyphenoxy)phenylacetic acid.

EXAMPLE 18

*4-[3,5-diiodo-4-(3-iodo-4-hydroxyphenoxy)phenyl]-1-butanol*

In the same manner as shown in Example 1, 4-[3,5-diiodo-4-(3-iodo - 4 - hydroxyphenoxy)phenyl]-1-butanol was prepared by substituting 4-[3,5-diodo-4-(3-iodo-4-hydroxyphenoxy)phenyl]butyric acid for 3,5-diiodo-4-(3,5-dimethyl-4-hydroxyphenoxy)phenylacetic acid.

EXAMPLE 19

*3-[3,5-diiodo-4-(3,5-diiodo-4-hydroxyphenoxy)phenyl]-1-propanol*

In the same manner as shown in Example 1, 3-[3,5-diiodo-4-(3,5-diiodo - 4 - hydroxyphenoxy)phenyl]-1-propanol was prepared by substituting 3-[3,5-diiodo-4-(3,5-diiodo-4-hydroxyphenoxy)phenyl]propionic acid for 3,5-diiodo-4-(3,5-dimethyl - 4 -hydroxyphenoxy)phenylacetic acid. The compound melted between 202–203° C.

*Analysis.*—Calcd. for $C_{15}H_{12}I_4O_3$: C, 24.08; H, 1.62. Found: C, 24.32; H, 1.74.

EXAMPLE 20

*3-[3,5-diiodo-4-(3,5-diiodo-4-methoxyphenoxy)phenyl]-1-propanol*

In the same manner as shown in Example 1, 3-[3,5-diiodo-4-(3,5-diiodo - 4 - methoxyphenoxy)phenyl]-1-propanol was prepared by substituting 3-[3,5-diiodo-4-(3,5-diiodo-4-methoxyphenoxy)phenyl]propionic acid for 3,5-diiodo-4-(3,5-dimethyl - 4 - hydroxyphenoxy)phenylacetic acid.

EXAMPLE 21

*3-[3,5-diiodo-4-(3-iodo-4-methoxyphenoxy)phenyl]-1-propanol*

In the same manner as shown in Example 1, 3-[3,5-diiodo-4-(3 - iodo-4-methoxyphenoxy)phenyl]-1-propanol was prepared by substituting 3-[3,5-diiodo-4-(3-iodo-4-methoxyphenoxy)phenyl]propionic acid for 3,5-diiodo-4-(3,5-dimethyl-4-hydroxyphenoxy)phenylacetic acid.

EXAMPLE 22

*3,5-diiodo-4-(3,5-diiodo-4-hydroxyphenoxy)benzyl alcohol*

In the same manner as shown in Example 1, 3,5-diiodo-4-(3,5-diiodo-4-hydroxyphenoxy)benzyl alcohol was prepared by substituting 3,5-diiodo-4-(3,5-diiodo-4-hydroxyphenoxy)benzoic acid for 3,5-diiodo-4-(3,5-dimethyl-4-hydroxyphenoxy)phenylacetic acid.

EXAMPLE 23

*3,5-diiodo-4-(3-iodo-4-methoxyphenoxy)phenethyl alcohol*

In the same manner as shown in Example 1, 3,5-diiodo-4-(3-iodo-4-methoxyphenoxy)phenethylalcohol was prepared by substituting 3,5-diiodo-4-(3-iodo-4-methoxyphenoxy)phenylacetic acid for 3,5-diiodo-4-(3,5-dimethyl-4-hydroxyphenoxy)phenylacetic acid.

EXAMPLE 24

*3-[3,5-diiodo-4-(3-iodo-4-hydroxyphenoxy)phenyl]-1-propanol dipropionate*

In the same manner as shown in Example 3, 3-[3,5-diiodo-4-(3-iodo-4-hydroxyphenoxy)phenyl] - 1-propanol dipropionate was prepared by substituting 3-[3,5-diiodo-4-(3-iodo-4-hydroxyphenoxy)phenyl] - 1 - propanol and propionic anhydride for 3,5-diiodo-4-(3,5-dimethyl-4-hydroxyphenoxy)phenethyl alcohol and acetic anhydride.

EXAMPLE 25

*4-[3,5-diiodo-4-(3,5-diiodo-4-hydroxyphenoxy)phenyl]-1-butanol dibutyrate*

In the same manner as shown in Example 3, 4-[3,5-diido-4 - (3,5 - diiodo-4-hydroxyphenoxy)phenyl]-1-butanol dibutyrate was prepared by substituting 4-[3,5-diiodo-4 - (3,5-diiodo-4-hydroxyphenoxy)phenyl]-1-butanol and butyric anhydride for 3,5-diiodo-4-(3,5-dimethyl-4-hydroxyphenoxy)phenethyl alcohol and acetic anhydride.

EXAMPLE 26

*3,5-diiodo-4-(2,3,5,6-tetraethyl-4-propoxyphenoxy)phenethyl alcohol*

In the same manner as shown in Example 1, 3,5-diiodo-4-(2,3,5,6 - tetraethyl-4-propoxyphenoxy)phenethyl alcohol was prepared by substituting 3,5-diiodo-4-(2,3,5,6-tetraethyl-4-propoxyphenoxy)phenylacetic acid for 3,5-diiodo-4-(3,5 - dimethyl-4-hydroxyphenoxy)phenylacetic acid.

EXAMPLE 27

*3-[3,5-diiodo-4-(2,3,5,6-tetrapropyl-4-butoxy-phenoxy)-phenyl]-1-propanol*

In the same manner as shown in Example 1, 3-[3,5-diiodo-4-(2,3,5,6-tetrapropyl-4-butoxyphenoxy)phenyl] - 1-propanol was prepared by substituting 3-[3,5-diiodo-4-

(2,3,5,6 - tetrapropyl-4-butoxyphenoxy)phenyl]propionic acid for 3,5 - diiodo-4-(3,5-dimethyl-4-hydroxyphenoxy) phenylacetic acid.

EXAMPLE 28

*4-[3,5-diiodo-4-(2,3,5,6-tetrabutyl-4-hydroxyphenoxy) phenyl]-1-butanol*

In the same manner as shown in Example 1, 4-[3,5-diidod - 4-(2,3,5,6-tetrabutyl-4-hydroxyphenoxy)phenyl]-1-butanol was prepared by substituting 4-[3,5-diiodo-4-(2,-3,5,6 - tetrabutyl-4-hydroxyphenoxy)phenyl]butyric acid for 3,5 - diiodo-4-(3,5-dimethyl-4-hydroxyphenoxy)phenylacetic acid.

EXAMPLE 29

*3,5-diiodo-4-(3,5-dichloro-4-hydroxyphenoxy)phenethyl alcohol*

In the same manner as shown in Example 1, 3,5-diiodo-4-(3,5-dichloro-4-hydroxyphenoxy)phenethyl alcohol was prepared by substituting 3,5-diiodo-4-(3,5-dichloro-4-hydroxyphenoxy)phenylacetic acid for 3,5-diiodo-4-(3,5-dimethyl-4-hydroxyphenoxy)phenylacetic acid.

EXAMPLE 30

*3-[3,5-diiodo-4-(3,5-difluoro-4-hydroxyphenoxy) phenyl]-1-propanol*

In the same manner as shown in Example 1, 3-[3,5-diiodo-4-(3,5-difluoro-4-hydroxyphenoxy)phenyl] - 1 - propanol was prepared by substituting 3-[3,5-diiodo-4-(3,5-difluoro-4-hydroxyphenoxy)phenyl]propionic acid for 3,-5-diiodo-4-(3,5-dimethyl-4-hydroxyphenoxy)phenylacetic acid.

EXAMPLE 31

*4-[3,5-diiodo-4-(3,5-dibromo-4-hydroxyphenoxy)-phenyl]-1-butanol*

In the same manner as shown in Example 1, 4-[3,5-diiodo - 4 - (3,5-dibromo-4-hydroxyphenoxy)phenyl]-1-butanol was prepared by substituting 4-[3,5-diiodo-4-(3,5-dibromo-4-hydroxyphenoxy)phenyl]butyric acid for 3,5-diodo-4-(3,5-dimethyl - 4 - hydroxyphenoxy)phenylacetic acid.

EXAMPLE 32

*3,5-diiodo-4-(3-iodo-4-hydroxyphenoxy)benzyl alcohol*

In the same manner as shown in Example 1, 3,5-diiodo-4-(3-iodo-4-hydroxyphenoxy)benzyl alcohol was prepared by substituting 3,5-diiodo-4-(3-iodo-4-hydroxyphenoxy)benzoic acid for 3,5-diiodo-4-(3,5-dimethyl-4-hydroxyphenoxy)phenylacetic acid.

EXAMPLE 33

*3,5-diiodo-4-(4-hydroxyphenoxy)benzyl alcohol*

In the same maner as shown in Example 1, 3,5-diiodo-4-(4-hydroxyphenoxy)benzyl alcohol was prepared by substituting 3,5-diiodo-4-(4-hydroxyphenoxy)benzoic acid for 3,5 - diiodo-4-(3,5-dimethyl-4-hydroxyphenoxy)phenylacetic acid. The compound melted between 173–174.5° C.

*Analysis.*—Calcd. for $C_{13}H_{10}I_2O_3$: C, 33.35; H, 2.15; I, 54.23. Found: C, 33.33; H, 1.97; I, 54.17.

EXAMPLE 34

*3,5-diiodo-4-(4-methoxyphenoxy)benzyl alcohol*

In the same manner as shown in Example 1, 3,5-diiodo-4-(4-methoxyphenoxy)benzyl alcohol was prepared by substituting 3,5 - diiodo-4-(4-methoxyphenoxy)benzoic acid for 3,5-diiodo-4-(3,5-dimethyl-4-hydroxyphenoxy)-phenylacetic acid.

EXAMPLE 35

*3,5-diiodo-4-(3,5-diiodo-4-hydroxyphenoxy)benzyl alcohol*

In the same manner as shown in Example 1, 3,5-diiodo-4-(3,5-diiodo-4-hydroxyphenoxy)benzyl alcohol was prepared by substituting 3,5-diiodo-4-(3,5-diiodo-4-hydroxyphenoxy)benzoic acid for 3,5-diiodo-4-(3,5-dimethyl-4-hydroxyphenoxy)phenylacetic acid. The compound melted between 220.5–221.5°C.

*Analysis.*—Calcd. for $C_{13}H_8I_4O_3$: C, 21.68; H, 1.12; I, 70.52. Found: C, 21.97; H, 1.27; I, 70.11.

EXAMPLE 36

*3,5-diiodo-4-(3,5-dimethyl-4-hydroxyphenoxy)phenethyl acetate*

3,5-diiodo-4-(3,5-dimethyl-4-hydroxyphenoxy)phenethyl acetate was prepared by substituting 3,5-dimethyl-4-methoxyphenol for p-methoxyphenol in the process disclosed in J. Biol. Chem. 235, 3292 (1960).

EXAMPLE 37

*2-[3,5-diiodo-4-(4-hydroxyphenoxy)phenyl]-1-butanol*

2-[3,5-diiodo-4-(4-hydroxyphenoxy)phenyl]-1-butanol was prepared by substituting ethyl 2-(4-hydroxyphenyl)-butyrate for ethyl 4-hydroxyphenylacetate in the process disclosed in J. Biol. Chem. 235, 3292 (1960).

EXAMPLE 38

*3,5-diiodo-4-(3,5-dimethyl-4-butyryloxyphenoxy)-phenethyl alcohol*

3,5-diiodo-4-(3,5-dimethyl-4-butyryloxyphenoxy)phenethyl alcohol was prepared by reacting 3,5-diiodo-4-(3,5-dimethyl-4-hydroxyphenoxy)phenylacetic acid with butyric anhydride and reducing the resulting 3,5-diiodo-4-(3,-5-dimethyl-4-butyryloxyphenoxy)phenylacetic acid with diborane in the manner disclosed in Example 1.

EXAMPLE 39

*3,5-diiodo-4-(3,5-dimethyl-4-methoxyphenoxy)phenethyl acetate*

3,5 - diiodo-4-(3,5-dimethyl-4-methoxyphenoxy)phenethyl acetate was prepared by reacting 3,5-diiodo-4-(3,5-dimethyl-4-methoxyphenoxy)phenethyl alcohol with acetic anhydride.

EXAMPLE 40

*3,5-diiodo-4-(3,5-dimethyl-4-hydroxyphenoxy)phenethyl phosphate*

3,5 - diiodo - 4-(3,5-dimethyl-4-hydroxyphenoxy)phenethyl phosphate was prepared by reacting 1 mole equivalent of 3,5 - diiodo-4-(3,5-dimethyl-4-butyryloxyphenoxy)phenethyl alcohol with about 2 mole equivalents of 2-cyanoethyl phosphate at 25° C. in the presence of anhydrous pyridine and about 8 mole equivalents of dicyclohexylcarbodiimide and hydrolyzing the resulting product with lithium hydroxide at about 100° C. for 2 hours.

EXAMPLE 41

*3,5 - diiodo-4-(3,5-dimethyl-4-acetoxyphenoxy)phenethyl phosphate*

3,5 - diiodo - 4-(3,5-dimethyl-4-acetoxyphenoxy)phenethyl phosphate was prepared by reacting 3,5-diiodo-4-(3,5 - dimethyl - 4-hydroxyphenoxy)phenethyl phosphate with acetic anhydride.

EXAMPLE 42

*3,5 - diiodo - 4 - (3,5-dimethyl-4-methoxyphenoxy)phenethyl phosphate*

3,5 - diiodo - 4-(3,5-dimethyl-4-methoxyphenoxy)phenethyl phosphate was prepared by reacting 1 mole equivalent of 3,5-diiodo-4-(3,5-dimethyl-4-methoxyphenoxy)- phenethyl alcohol with about 2 mole equivalents of 2-cyanoethyl phosphate at 25° C. in the presence of anhydrous pyridine and about 8 mole equivalents of dicyclohexylcarbodiimide and hydrolyzing the resulting product with lithium hydroxide at about 100° C. for 2 hours.

EXAMPLE 43

*3,5 - dibromo - 4-(3,5-dimethyl-4-methoxyphenoxy)phenethyl alcohol and acetate thereof*

To a chilled solution of 4.0 g. of 3,5-dibromo-4-(3,5-dimethyl-4-methoxyphenoxy)phenylacetic acid in 100 ml. of dry tetrahydrofuran was added 20 ml. of a 1.9 M solution of diborane in dry tetrahydrofuran. The reaction mixture was maintained between about 5–25° C. for 1.5 hours, and chipped ice was added until gas evolution ceased. Water (50 ml.) was added and the mixture was concentrated at reduced pressure to remove tetrahydrofuran. To the residual mixture of water and syrup, 50 ml. of water was added. The mixture was allowed to stand at about 25° C. and the syrup crystallized. The crystalline material was recrystallized from aqueous acetone to obtain 2.38 g. of 3,5-dibromo-4-(3,5-dimethyl-4-methoxyphenoxy)phenethyl alcohol melting between 100.5–101.5° C. A second crop (0.72 g.; M.P. 99–100° C.) of this compound was obtained from the mother liquor. Elemental analysis was carried out on the first crop.

*Analysis.*—Calcd. for $C_{17}H_{18}Br_2O_3$: C, 47.47; H, 4.22; Br, 37.16. Found: C, 47.70; H, 4.52; Br, 37.12.

3,5 - dibromo - 4 - (3,5-dimethyl-4-methoxyphenoxy)-phenethyl acetate was prepared by reacting 3,5-dibromo-4 - (3,5 - dimethyl-4-methoxyphenoxy)phenethyl alcohol with acetic anhydride.

EXAMPLE 44

*3,5 - dibromo - 4-(3,5-dimethyl-4-hydroxyphenoxy)phenethyl alcohol and esters thereof*

In the same manner as shown in Example 43, 3,5-dibromo - 4 - (3,5 - dimethyl-4-hydroxyphenoxy)phenethyl alcohol was prepared by substituting 3,5-dibromo-4-(3,5-dimethyl-4-hydroxyphenoxy)phenylacetic acid for 3,5-dibromo - 4-(3,5-dimethyl-4-methoxy-phenoxy)phenylacetic acid.

3,5-dibromo-4-(3,5-dimethyl-4-hydroxyphenoxy)phenethyl alcohol diacetate was prepared by reacting 3,5-dibromo - 4 - (3,5-dimethyl-4-hydroxyphenoxy)phenethyl alcohol with acetic anhydride.

3,5 - dibromo-4-(3,5-dimethyl-4-acetoxyphenoxy)phenethyl alcohol was prepared by reacting 3,5-dibromo-4-(3,5 - dimethyl-4-hydroxyphenoxy)phenylacetic acid with acetic anhydride and reducing the resulting 3,5-dibromo-4-(3,5-dimethyl-4-acetoxyphenoxy)phenylacetic acid with diborane according to the procedure shown in Example 43.

3,5-dibromo-4-(3,5-dimethyl-4-hydroxyphenoxy)phenethyl phosphate was prepared by substituting 3,5-dibromo-4-(3,5-dimethyl-4-acetoxyphenoxy)phenethyl alcohol for 3,5 - diiodo - 4-(3,5-dimethyl-4-butyryloxyphenoxy)phenethyl alcohol in the procedure shown in Example 40.

3,5 - dibromo-4-(3,5-dimethyl-4-acetoxyphenoxy)phenethyl phosphate was prepared by reacting 3,5-dibromo-4-(3,5 - dimethyl-4-hydroxyphenoxy)phenethyl phosphate with acetic anhydride.

EXAMPLE 45

*3,5-dibromo-4-(4-hydroxyphenoxy)phenethyl alcohol*

In the same manner as shown in Example 43, 3,5-dibromo-4-(4-hydroxyphenoxy)phenethyl alcohol was prepared by substituting 3,5-dibromo-4-(4-hydroxyphenoxy)-phenylacetic acid for 3,5 - dibromo - 4-(3,5-dimethyl-4-methoxyphenoxy)phenylacetic acid.

EXAMPLE 46

*3,5-dibromo-4-(4-methoxyphenoxy)phenethyl alcohol*

In the same manner as shown in Example 43, 3,5-dibromo-4-(4-methoxyphenoxy)phenethyl alcohol was prepared by substituting 3,5-dibromo-4-(4-methoxyphenoxy)-phenylacetic acid for 3,5 - dibromo - 4-(3,5-dimethyl-4-methoxyphenoxy)phenylacetic acid.

EXAMPLE 47

*3,5 - dibromo - 4-(3-bromo-4-hydroxyphenoxy)phenethyl alcohol*

In the same manner as shown in Example 43, 3,5-dibromo-4-(3-bromo-4-hydroxyphenoxy)phenethyl alcohol was prepared by substituting 3,5-dibromo-4-(3-bromo-4-hydroxyphenoxy)phenylacetic acid for 3,5 - dibromo-4-(3,5-dimethyl-4-methoxyphenoxy)phenylacetic acid.

EXAMPLE 48

*3,5-dibromo-4-(3,5-dibromo-4-hydroxyphenoxy)phenethyl alcohol*

In the same manner as shown in Example 43, 3,5-dibromo - 4 - (3,5-dibromo-4-hydroxyphenoxy)phenethyl alcohol was prepared by substituting 3,5-dibromo-4-(3,5-dibromo -4- hydroxyphenoxy)phenlacetic acid for 3,5-dibromo - 4-(3,5-dimethyl-4-methoxyphenoxy)phenylacetic acid.

EXAMPLE 49

*3-[3,5-dibromo-4-(2,5-diethyl-4-methoxyphenoxy)phenyl]-1-propanol*

In the same manner as shown in Example 43 3-[3,5-dibromo-4-(2,5-diethyl-4 - methoxyphenoxy)phenyl] - 1-propanol was prepared by substituting 3-[3,5-dibromo-4-(2,5-diethyl-4-methoxyphenoxy)phenyl]propionic acid for 3,5-dibromo-4-(3,5-dimethyl-4 - methoxyphenoxy)phenylacetic acid.

EXAMPLE 50

*3,5-dibromo-4-(2,3-dimethyl-4-butoxyphenoxy)benzyl alcohol*

In the same manner as shown in Example 43, 3,5-dibromo-4-(2,3-dimethyl-4 - butoxyphenoxy)benzyl alcohol was prepared by substituting 3,5-dibromo-4-(2,3-dimethyl-4-butoxyphenoxy)benzoic acid for 3,5-dibromo-4-(3,5-dimethyl-4-methoxyphenoxy)phenylacetic acid.

EXAMPLE 51

*3,5-dibromo-4-(3-chloro-4-hydroxyphenoxy)phenethyl alcohol*

In the same manner as shown in Example 43, 3,5-dibromo-4-(3-chloro-4 - hydroxyphenoxy)phenethyl alcohol was prepared by substituting 3,5-dibromo-4-(3-chloro-4-hydroxyphenoxy)phenylacetic acid for 3,5-dibromo-4-(3,5-dimethyl-4-methoxyphenoxy)phenylacetic acid.

EXAMPLE 52

*3,5-dibromo-4-(4-acetoxyphenoxy)phenethyl alcohol*

In the same manner as shown in Example 43, 3,5-dibromo-4-(4-acetoxyphenoxy)phenethyl alcohol was prepared by substituting 3,5-dibromo-4-(4-acetoxyphenoxy) phenylacetic acid for 3,5-dibromo-4-(3,5 - dimethyl - 4-methoxyphenoxy)phenylacetic acid.

EXAMPLE 53

*3,5-dichloro-4-(4-hydroxyphenoxy)phenethyl alcohol*

In the same manner as shown in Example 43, 3,5-dichloro-4-(4-hydroxyphenoxy)phenethyl alcohol was prepared by substituting 3,5-dichloro-4-(4-hydroxyphenoxy) phenylacetic acid for 3,5-dibromo-4-(3,5 - dimethyl - 4-methoxyphenoxy)phenylacetic acid.

EXAMPLE 54

*3,5-dichloro-4-(4-methoxyphenoxy)phenethyl alcohol*

In the same manner as shown in Example 43, 3,5-dichloro-4-(4-methoxyphenoxy)phenethyl alcohol was prepared by substituting 3,5-dichloro-4-(4-methoxyphenoxy)phenylacetic acid for 3,5-dibromo-4-(3,5 - dimethyl - 4-methoxyphenoxy)phenylacetic acid.

EXAMPLE 55

*3,5-dichloro-4-(3-chloro-4-hydroxyphenoxy)phenethyl alcohol*

In the same manner as shown in Example 43, 3,5-dichloro-4-(3-chloro-4-hydroxyphenoxy)phenethyl alcohol was prepared by substituting 3,5-dichloro-4-(3-chloro-4-hydroxyphenoxy)phenylacetic acid for 3,5-dibromo-4-(3,5-dimethyl-4-methoxyphenoxy)phenylacetic acid.

EXAMPLE 56

*3,5-dichloro-4-(3,5-dichloro-4-hydroxyphenoxy) phenethyl alcohol*

In the same manner as shown in Example 43, 3,5-dichloro-4-(3,5-dichloro-4-hydroxyphenoxy)phenethyl alcohol was prepared by substituting 3,5-dichloro-4-(3,5-dichloro-4-hydroxyphenoxy)phenylacetic acid for 3,5-dibromo-4-(3,5-dimethyl-4 - methoxyphenoxy)phenylacetic acid.

EXAMPLE 57

*3,5-dichloro-4-(4-hydroxyphenoxy)benzyl alcohol*

In the same manner as shown in Example 43, 3,5-dichloro-4-(4-hydroxyphenoxy)benzyl alcohol was prepared by substituting 3,5-dichloro-4-(4-hydroxyphenoxy)benzoic acid for 3,5-dibromo-4-(3,5-dimethyl-4-methoxyphenoxy)phenylacetic acid.

EXAMPLE 58

*3,5-dichloro-4-(3-chloro-4-hydroxyphenoxy)benzyl alcohol*

In the same manner as shown in Example 43, 3,5-dichloro-4-(3-chloro-4-hydroxyphenoxy)benzyl alcohol was prepared by substituting 3,5-dichloro-4-(3-chloro-4-hydroxyphenoxy)benzoic acid for 3,5-dibromo-4-(3,5-dimethyl-4-methoxyphenoxy)phenylacetic acid.

EXAMPLE 59

*4-[3,5-dichloro-4-(2-isopropyl-5-methyl-4-methoxyphenoxy)phenyl]-1-butanol*

In the same manner as shown in Example 43, 4-[3,5-dichloro-4-(2-isopropyl-5 - methyl - 4 - methoxyphenoxy)phenyl]-1-butanol was prepared by substituting 4-[3,5-dichloro-4-(2-isopropyl-5-methyl - 4 - methoxyphenoxy)phenyl]butyric acid for 3,5-dibromo-4-(3,5-dimethyl - 4-methoxyphenoxy)phenylacetic acid.

EXAMPLE 60

*3,5-dichloro-4-(3,5-dimethyl-4-methoxyphenoxy) phenethyl alcohol*

In the same manner as shown in Example 43, 3,5-dichloro-4-(3,5-dimethyl - 4 - methoxyphenoxy)phenethyl alcohol was prepared by substituting 3,5-dichloro-4-(3,5-dimethyl-4-methoxyphenoxy)phenylacetic acid for 3,5-dibromo-4-(3,5-dimethyl-4 - methoxyphenoxy)phenylacetic acid.

EXAMPLE 61

*3,5-dichloro-4-(3,5-dimethyl-4-hydroxyphenoxy) phenethyl alcohol and diacetate thereof*

In the same manner as shown in Example 43, 3,5-dichloro-4-(3,5-dimethyl - 4 - hydroxyphenoxy)phenethyl alcohol was prepared by substituting 3,5-dichloro-4-(3,5-dimethyl-4-hydroxyphenoxy)phenylacetic acid for 3,5-dibromo-4-(3,5-dimethyl-4 - methoxyphenoxy)phenylacetic acid.

3,5-dichloro-4-(3,5 - dimethyl - 4 - hydroxyphenoxy)phenethyl alcohol diacetate was prepared by reacting the foregoing phenolic alcohol with acetic anhydride.

EXAMPLE 62

*3-[3-bromo-5-iodo-4-(4-hydroxyphenoxy)phenyl]-1-propanol*

In the same manner as described in Example 43, 3-[3-bromo-5-iodo-4-(4-hydroxyphenoxy)phenyl]-1 - propanol was prepared by substituting 3-[3-bromo-5-iodo-4-(4-hydroxyphenoxy)phenyl]propionic acid for 3,5-dibromo-4-(3,5-dimethyl-4-methoxyphenoxy)phenylacetic acid.

Atherosclerosis is characterized by fatty degeneration occurring in the arterial walls, although the underlying mechanism has not been definitively established. It has been observed, however, that hypercholesteremia is a common finding in mammals and other animals with atherosclerosis. Hypercholesteremia refers essentially to an excess of cholesterol in the blood serum. While the causes of hypercholesteremia and the nature of its role in atherosclerosis and related conditions is not clearly understood, considerable effort has been directed toward reducing blood and tissue cholesterol levels as an attack on the clinical conditions in which high levels are implicated. It has long been recognized that certain substances such as sitosterol, corn oil, and nicotinic acid are capable of reducing in small degree the blood and tissue cholesterol contents, either by interfering with the absorption of exogenous cholesterol introduced with food, or by facilitating in some manner the excretion of cholesterol from the body. Major emphasis, however, has been placed on the search for compounds which will interfere with the production of endogenous cholesterol by the liver and hence offer a more positive means for control of cholesterol levels.

It has now been found that compositions containing the principal active ingredients as described herein (Formula I) are capable of significantly reducing the cholesterol content of both blood and tissue by increasing the metabolism and excretion of cholesterol in the body.

It has also been found that the (4-phenoxy-3,5-dihalophenyl) alkanoic acids (Formula III) are also capable of reducing the cholesterol content of both blood and tissue.

The dosage of the principal active ingredients, i.e., (4-phenoxy-3,5-dihalophenylalkanols (Formula I), of these compositions in mammals and animals must be determined individually according to the subject's age, weight, response to the medication, severity of the condition being treated, and the route of administration. Single doses of between about 0.5 and about 500 mg. of active ingredient are administered as indicated, preferably from about 2 to about 50 mg. one to four times daily. In adapting the present compositions to veterinary practice the dosage should be adjusted on an approximate weight ratio basis.

In addition to the foregoing Formula I compounds as sole active ingredients, other complementary ingredients can be included to secure advantageous combinations of properties specially adapted to individual siutations. Such combinations include in each dosage unit conventional therapeutic amounts or less of other hypocholesteremic agents such as 22,25-diazacholestanol, the D-isomer of 3,5,3' - triiodothyronine, and thyroxine-like compounds such as sodium L-thyroxine and sodium D-thyroxine; glucocorticoids such as hydrocortisone, prednisolone, 6α-fluoroprednisolone, and 6α-methylprednisolone; anticoagulants such as heparin, 2-diphenylacetyl-1,3-indandione, polyethylenesulfonate, and dicumarol or its derivatives; vitamins such as nicotinic acid, ascorbic acid, mixed tocopherols, vitamin $B_{12}$, and pyridoxine hydrochloride; estrogens such as estradiol and ethinyl estradiol; androgens such as testosterone, methyltestosterone, and fluoxymesterone; combinations of estrogens and androgens such as estradiol and testosterone; unsaturated fatty acids or esters such as safflower oil, lecithin, corn oil, and linoleic acid or esters; antibiotics such as neomycin; ion-exchange resins such as cholestyramine; analgesics such as aspirin; hypoglycemic agents such as tolbutamide; compounds associated with cholesterol synthesis or metabolism such as α-phenylbutyric acid, α-p-biphenylbutyric acid, and ethyl α-(p-chlorophenoxy) isobutyrate; lipotropic agents such as choline and inositol; amino acids such as dl-methionine, taurine, and glycine; sterols such as sitosterol and other plant sterols; diuretics such as ethoxzolamide, acetozolamide, and hydrochlorothiazide; anorexigenic agents such as amphetamine; cardiovascular agents (including vasodilators and hypotensive agents) such as chlorisondamine chloride, hexamethonium chloride, and pentaerythritol tetranitrate. In general, the amounts of such supplementary active ingredients incorporated in the unit doses of the compositions hereof should not exceed the normal single dose amounts associated with such agents.

In adapting the active ingredients for use in mammals and birds, the novel compositions are suitably presented for administration in unit dosage form as tablets, pills, capsules, powders, wafers, cachets, granules, sterile parenteral solutions or suspensions in aqueous or oil vehicles, oral aqueous or oil dispersions, including syrups and elixirs, and the like. When the active materials are used in a solid oral dosage form or in a fluid dispersion for oral or intramuscular administration, improved results are obtained when the materials are in a fine particle size of about 10 microns or less.

For preparing solid compositions such as tablets, the active ingredients is mixed with a conventional tableting component such as cornstarch, lactose, dicalcium, phosphate, talc, stearic acid, calcium stearate, gums, and functionally similar materials constituting pharmaceutical diluents, lubricants, granulating agents, or carriers. The tablets or pills can be laminated or otherwise compounded to provide a dosage form affording the advantage of prolonged or delayed action or of predetermined successive action of the enclosed medication. For example, the tablet or pill can comprise an inner dosage and outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate phthalate (as described in U.S. Patent 2,196,768), and the like. A particularly advantageous enteric coating comprises a styrene-maleic acid copolymer together with known materials contributing to the enteric properties of the coating.

The liquid forms in which the novel composition of this invention can be incorporated include aqueous dispersions, suitably flavored syrups, emulsions or suspensions with edible oils such as corn oil, cottonseed oil, safflower oil, soybean oil, and the like, as well as elixirs and similar pharmaceutical vehicles. Suitable dispersing or suspending agents for aqueous suspensions include the synthetic and natural gums such as tragacanth, acacia, alginate, dextran, methylcellulose, polyvinylpyrrolidone, gelatin, and the like.

For injectable solutions or suspensions, conventional preservatives, buffers, isotonic agents and suspending agents are advantageously employed. Suitable preservatives include chlorobutanol, myristyl gamma picolinium chloride, benzyl alcohol, the methyl- and propylparabens, and sodium ethyl mercurithiosalicylate. Potassium chloride is preferred as an isotonic agent. Among the suspending agents which are suitable for present purposes are polyethylene glycol 4000 or 6000, polyvinylpyrrolidone, dextran, methylcellulose, and surfactants such as polysorbate 80.

The following examples illustrate the best mode contemplated by the inventors for carrying out the invention but are not to be construed as limiting the scope thereof.

*Example I.—Compressed tablets*

A lot of 10,000 scored, compressed tablets, each containing 4 mg. of 3,5-diiodo-4-(3,5-dimethyl-4-hydroxyphenoxy)phenethyl alcohol is prepared from the following ingredients:

| | Gm. |
|---|---|
| 3,5-diiodo-4-(3,5-dimethyl-4-hydroxyphenoxy) phenethyl alcohol, micronized | 40 |
| Dicalcium phosphate | 2500 |
| Methylcellulose, USP (15 cps.) | 65 |
| Talc, bolted | 450 |
| Calcium stearate, fine powder | 35 |

The 3,5-diiodo-4-(3,5 - dimethyl - 4 - hydroxyphenoxy) phenethyl alcohol and dicalcium phosphate are mixed well, granulated with 7.5 percent solution of methylcellulose in water, passed through a No. 8 screen and dried at 120° F. The dried granules are passed through a No. 12 screen, mixed thoroughly with the talc and stearate and compressed into tablets.

*Example II.—Compressed tablets*

Following the procedure of Example I, but replacing the 3,5 - diiodo-4-(3,5-dimethyl-4-hydroxyphenoxy)phenethyl alcohol with 40 gm. of 3,5-dibromo-4-(3,5-dimethyl-4-methoxyphenoxy)phenethyl alcohol, there is obtained a lot of 10,000 scored, compressed tablets, each containing 4 mg. of active ingredient.

*Example III.—Compressed tablets*

Following the procedure of Example I, but employing 500 gm. of active ingredient, compressed tablets, each containing 50 mg. of 3,5-diiodo-4-(3,5-dimethyl-4-hydroxyphenoxy)phenethyl alcohol are prepared.

*Example IV.—Hard gelatin capsules*

A lot of 1000 hard gelatin capsules, each containing 1 mg. of 3,5-diiodo-4-(3,5-dimethyl - 4 - hydroxyphenoxy) phenethyl alcohol diacetate is prepared from the following ingredients:

| | Gm. |
|---|---|
| 3,5-diiodo-4-(3,5-dimethyl-4-hydroxyphenoxy) phenethyl alcohol diacetate, micronized | 1 |
| Starch, dried | 150 |
| Calcium stearate | 2 |
| Talc | 3 |

The starch, talc, stearate and 3,5-diiodo-4-(3,5-dimethyl-4-hydroxyphenoxy)phenethyl alcohol diacetate are mixed well and the mixture is filled into two-piece hard gelatin capsules.

*Example V.—Hard gelatin capsules*

Following the procedure of Example IV, but employing 250 gm. of active ingredient and reducing the amount of starch to 30 gm., hard gelatin capsules each containing 250 mg. of 3,5-diiodo-4-(3,5-dimethyl-4-hydroxyphenoxy) phenethyl alcohol diacetate are prepared.

*Example VI.—Hard gelatin capsules*

A lot of 1000 hard gelatin capsules, each containing 60 mg. of 3,5-diiodo-4-(3,5-dimethyl-4-hydroxyphenoxy) phenethyl alcohol is prepared from the following ingredients:

| | Gm. |
|---|---|
| 3,5-diiodo-4-(3,5-dimethyl-4-hydroxyphenoxy) phenethyl alcohol, micronized | 60 |
| Lactose U.S.P. | 180 |
| Talc U.S.P. | 20 |

All the materials are mixed well and the mixture filled into No. 2 hard gelatin capsules so that each capsule contains 60 mg. of the active material.

Example VII.—Soft gelatin capsules

A batch of 1000 soft gelatin capsules, each containing 50 mg. of 4-[3,5-diiodo-4-(3,5-diiodo-4-hydroxyphenoxy) phenyl]-1-butanol and corn oil is prepared from the following materials:

| | Gm. |
|---|---|
| 4-[3,5-diiodo-4-(3,5-diiodo-4-hydroxyphenoxy) phenyl]-1-butanol | 50 |
| Corn oil, q.s. | |

A uniform dispersion of the active ingredient in sufficient corn oil is prepared and the dispersion filled into soft gelatin capsules by conventional means.

Example VIII.—Aqueous oral suspension

An aqueous oral suspension containing in each 5 ml., 100 mg. of 3-[3,5-diiodo-4-(3-iodo-4-hydroxyphenoxy) phenyl]-1-propanol is prepared from the following materials:

| | | |
|---|---|---|
| 3-[3,5-diiodo-4-(3-iodo-4-hydroxyphenoxy)phenyl]-1-propanol, micronized | gm | 200 |
| Methylparaben USP | gm | 7.5 |
| Propylparaben USP | gm | 2.5 |
| Saccharin sodium | gm | 12.5 |
| Cyclamate sodium | gm | 2.5 |
| Glycerin | ml | 3000 |
| Tragacanth powder | gm | 100 |
| Orange oil flavor | gm | 10 |
| F. D. and C. orange dye | gm | 7.5 |
| Deionized water, q.s. to | ml | 10,000 |

Example IX.—Aqueous suspension for injection

A suspending vehicle is prepared from the following materials:

| | | |
|---|---|---|
| Polyethylene glycol 4000 | gm | 30 |
| Potassium chloride | gm | 11.2 |
| Polysorbate 80 | gm | 2 |
| Methylparaben | gm | 1.8 |
| Propylparaben | gm | 0.2 |
| Water for injection, q.s. | ml | 1000 |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 50 gm. of 3 - [3,5 - diiodo - 4 - (3 - iodo - 4 - hydroxyphenoxy)phenyl]-1-propanol which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 50 mg. of 3 - [3,5 - diiodo - 4 - (3 - iodo - 4 - hydroxyphenoxy) phenyl]-1-propanol.

Example X.—Compressed tablets

A lot of 10,000 tablets for oral use, each containing 2 mg. of 3,5 - diiodo - 4 - (3,5 - dimethyl - 4 - hydroxyphenoxy)penethyl alcohol is prepared from the following materials:

| | Gm. |
|---|---|
| 3,5 - diiodo - 4 - (3,5-dimethyl-4-hydroxyphenoxy) phenethyl alcohol, micronized | 20 |
| Vitamin $B_6$ | 5 |
| Nicotinic acid | 3000 |
| Ascorbic acid | 500 |
| Dibasic calcium phosphate | 600 |
| Talc | 150 |
| Methylcellulose USP (15 cps.) | 175 |
| Starch | 375 |
| Magnesium stearate | 10 |

All of the ingredients, except the last two, are mixed well and granulated with water. To the dried granules is added the lubrication mixture of starch and stearate, and the mixture is then compressed into tablets.

We claim:

1. A hypocholesteremic composition comprising as principal active ingredient from about 0.5 to about 500 mg. of a compound having the formula:

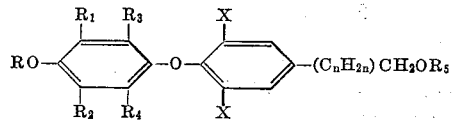

wherein R is selected from the group consisting of hydrogen, alkyl of 1 to 4 carbon atoms, inclusive, and acyl, wherein acyl is derived from an alkanoic acid containing 2 to 4 carbon atoms, inclusive; $R_1$ and $R_2$ are selected from the group consisting of hydrogen, alkyl of 1 to 4 carbon atoms, inclusive, and halogen; $R_3$ and $R_4$ are selected from the group consisting of hydrogen and alkyl of 1 to 4 carbon atoms, inclusive; $R_5$ is selected from the group consisting of hydrogen, phosphono, and acyl, wherein acyl is derived from an alkanoic acid containing 2 to 4 carbon atoms, inclusive; X is halogen; and $n$ is an integer from 0 to 3, inclusive, dispersed in a pharmaceutically acceptable carrier.

2. A hypocholesteremic composition comprising as principal active ingredient from about 2 to about 50 mg. of a compound having the formula:

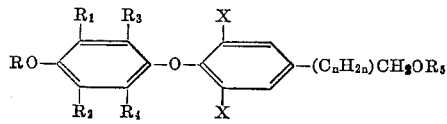

wherein R is selected from the group consisting of hydrogen, alkyl of 1 to 4 carbon atoms, inclusive, and acyl, wherein acyl is derived from an alkanoic acid containing 2 to 4 carbon atoms, inclusive; $R_1$ and $R_2$ are selected from the group consisting of hydrogen, alkyl of 1 to 4 carbon atoms, inclusive, and halogen; $R_3$ and $R_4$ are selected from the group consisting of hydrogen and alkyl of 1 to 4 carbon atoms, inclusive; $R_5$ is selected from the group consisting of hydrogen, phosphono, and acyl, wherein acyl is derived from an alkanoic acid containing 2 to 4 carbon atoms, inclusive; X is halogen; and $n$ is an integer from 0 to 3, inclusive, dispersed in a pharmaceutically acceptable carrier.

3. A hypocholesteremic composition comprising as principal active ingredient, in oral unit dosage form, from about 0.5 to about 500 mg. of 3,5-diiodo-4-(3,5-dimethyl-4-hydroxyphenoxy)phenethyl alcohol dispersed in a pharmaceutically acceptable carrier.

4. A hypocholesteremic composition comprising as principal active ingredient, in oral unit dosage form, from about 0.5 to about 500 mg. of 3-[3,5 - diiodo - 4 - (3-iodo-4 - hydroxyphenoxy)phenyl]-1-propanol dispersed in a pharmaceutically acceptable carrier.

5. A hypocholesteremic composition comprising as principal active ingredient, in oral unit dosage form, from about 0.5 to about 500 mg. of 3,5 - diiodo - 4 - (3,5-dimethyl - 4 - hydroxyphenoxy)phenethyl alcohol diacetate dispersed in a pharmaceutically acceptable carrier.

6. A hypocholesteremic composition comprising as principal active ingredient, in oral unit dosage form, from about 0.5 to about 500 mg. of 3,5-diiodo-4-(3,5-dimethyl-4-methoxyphenoxy)phenethyl alcohol dispersed in a pharmaceutically acceptable carrier.

7. A hypocholesteremic composition comprising as principal active ingredient, in oral unit dosage form, from about 0.5 to about 500 mg. of 3,5-dibromo-4-(3,5-dimethyl-4-methoxyphenoxy)phenethyl alcohol dispersed in a pharmaceutically acceptable carrier.

8. A hypocholesteremic composition comprising as principal active ingredient, in oral unit dosage form, from about 0.5 to about 500 mg. of 3,5-diiodo-4-(3,5-dimethyl - 4 - hydroxyphenoxy)phenethyl phosphate dispersed in a pharmaceutically acceptable carrier.

9. A hypocholesteremic composition comprising as principal active ingredient, in oral unit dosage form, from about 0.5 to about 500 mg. of 3,5-diiodo-4-(3-iodo-4-hydroxyphenoxy)phenethyl alcohol dispersed in a pharmaceutically acceptable carrier.

10. A process for the preparation of a compound having the formula:

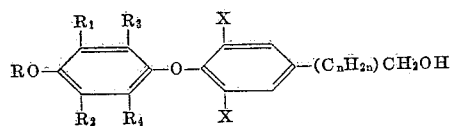

wherein R is selected from the group consisting of hydrogen, alkyl of 1 to 4 carbon atoms, inclusive, and acyl, wherein acyl is derived from an alkanoic acid containing 2 to 4 carbon atoms, inclusive; $R_1$ and $R_2$ are selected from the group consisting of hydrogen, alkyl of 1 to 4 carbon atoms, inclusive, and halogens; $R_3$ and $R_4$ are selected from the group consisting of hydrogen and alkyl of 1 to 4 carbon atoms, inclusive; X is halogen; and $n$ is an integer from 0 to 3, inclusive, which comprises the step of reducing a compound having the formula:

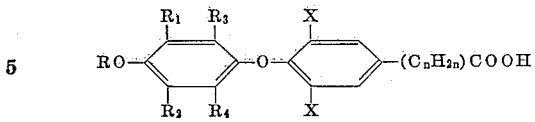

wherein R, $R_1$, $R_2$, $R_3$, $R_4$, X and $n$ have the above values with diborane.

11. 3,5 - diiodo - 4-(3,5-dimethyl-4-hydroxyphenoxy)-phenethyl alcohol.

12. 3,5 - diiodo - 4-(3,5-dimethyl-4-hydroxyphenoxy)-phenethyl alcohol diacetate.

13. 3,5 - diiodo - 4-(3,5-dimethyl-4-methoxyphenoxy)-phenethyl alcohol.

14. 3,5 - diiodo - 4-(3,5-dimethyl-4-hydroxyphenoxy)-phenethyl phosphate.

15. 3,5 - dibromo-4-(3,5-dimethyl-4-methoxyphenoxy)-phenethyl alcohol.

16. 3,5 - dibromo-4-(3,5-dimethyl-4-hydroxyphenoxy)-phenethyl alcohol.

17. 3,5 - dichloro-4-(3,5-dimethyl-4-hydroxyphenoxy)-phenethyl alcohol.

References Cited

UNITED STATES PATENTS 3,210,413   10/1965   Blank et al. _____ 260—624

ALBERT T. MEYERS, *Primary Examiner.*

JULIAN S. LEVITT, *Examiner.*

V. CLARKE, *Assistant Examiner.*